Patented Oct. 14, 1947

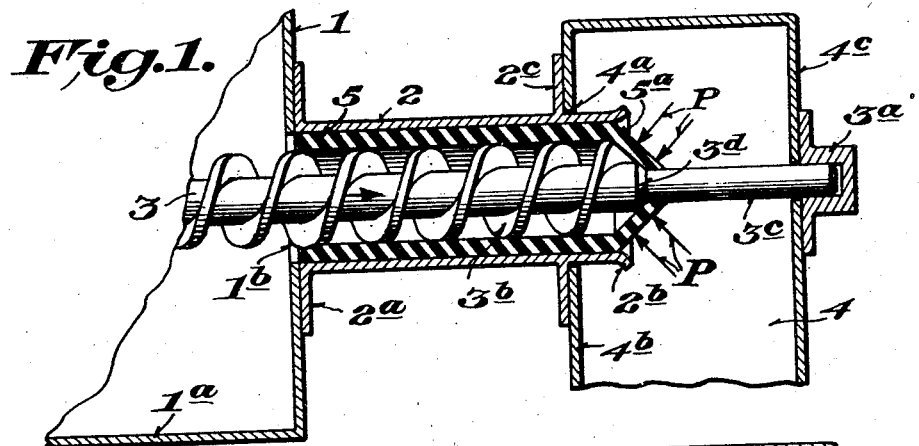
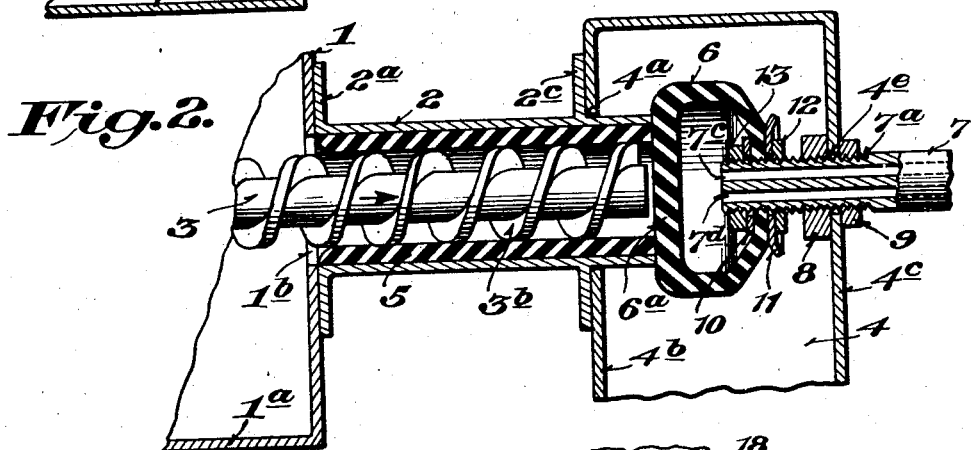
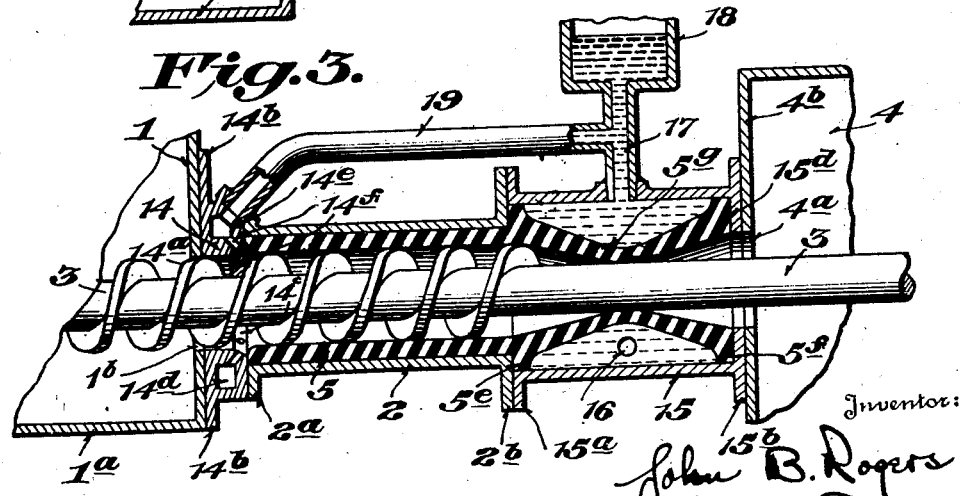

2,428,995

UNITED STATES PATENT OFFICE 2,428,995

FEEDING GRANULAR MATERIALS INTO A HEAD OF PRESSURE

John Berrien Rogers, Pasadena, Md.

Application May 11, 1945, Serial No. 593,296

4 Claims. (Cl. 214—17)

This invention is a novel apparatus and method for feeding granular or finely divided solid material from a feed hopper at atmospheric pressure into a head at above atmospheric pressure in a continuous operation, and while the invention is susceptible to many applications, same is particularly adapted for feeding granular material such as coal, into a stream of superheated steam having a pressure of 100 pounds per square inch and a temperature of 400° F.

One object of the invention is to provide an apparatus in which the material is fed from the hopper by a feed worm through a rubber lined feed throat having a conical lip serving as a valve at the outer end of the feed throat which latter enters a pressure manifold, said lip contracting at an angle around the worm axle to normally constitute a continuous seal at the outer end of the feed worm flights, the natural resiliency of the rubber of the lip and the pressure in the pressure manifold combining to hold the lip in sealing contact with the worm axle, whereby the granular material under pressure of the worm will force the lip open, the lip accommodating itself to fluctuations in the feed and preventing the pressures within the manifold from blowing the material back through the feed throat; and whereby in event the material flow or feed stops, the lip will assume its closed sealing position preventing loss of pressure back through the feed throat.

Another object of the invention is to provide a somewhat similar apparatus having a rubber lined feed throat, and having at its outer end within the pressure manifold a hollow rubber pillow inflated with gas or liquid, said pillow being adjustable with respect to the end of the throat, and the pressures within the pillow being adjustable so that the pillow will normally be held firmly against the outer end of the feed throat, the support for holding the pillow in position having ducts therein for admitting or withdrawing the gas or liquid from the pillow.

A further object of the invention is to provide a somewhat similar apparatus having an expandable hourglass shaped gland within the feed throat itself, actuated by gas or liquid pressure, said gland contracting around the feed worm axle to enable the granular or finely divided material to be fed against the head of pressure in the manifold, the pressure within the gland being governed and rendered resilient by means of air trapped in an air dome, the pressure expanding the gland around the extended worm axle; and the feed throat and gland being normally dry, or being lubricated with water from a lubricating ring at the entrance to the feed throat supplied by liquid from the gland whereby the granular material and throat lining will be lubricated and the material forced through the throat and against the inclined surface of the gland at the point where the gland meets the worm axle, constant pressure being maintained against the material by the pressure in the liquid chamber of the gland, but when sufficient feeding pressure is exerted to overcome the gland pressure the gland will be forced away from the axle sufficiently far to allow the passage of the granular material, the gland, however, preventing back pressure.

A still further object of the invention is to provide an apparatus as above described, in which water is circulated first into the gland to maintain with an air dome, a resilient pressure therein, the water also acting as a gland cooling agent, and the water then circulating to the lubricating water ring at the entrance of the feed thus providing an extremely heavy duty, high temperature, high speed worm for constant operation since rubber lubricated with water has an extremely low friction factor, and since the quantity of water required to maintain a complete "wetness" over the entire inner surface of the feed throat and expanding gland will be sufficient to also cool the gland. The feed worm in such devices is a very expensive item since it must be made of hard non-corrosive alloy, and is necessarily very rugged and heavy, and is difficult to machine; and therefore a still further object of my invention is to provide a rubber lining for the worm in the feed throat which will not only provide a perfect seal around the periphery of the worm flights, but will also prevent wear on the worm because of the fact that any granular particles, which are generally sharp, when caught between the worm flight and the feed throat lining will, instead of cutting the worm and lining, merely embed themselves in the soft material of the lining and eventually work themselves across the periphery of the worm flight from one side to the other side or into the space between the next flight; thereby doing little if any damage to either the worm or lining; and hence the expensive item, i. e., the worm, will be long lasting; and the rubber lining will outlast any other known material.

Other minor objects of the invention will be hereinafter set forth.

I will explain the invention with reference to the accompanying drawing which illustrates several practical embodiments thereof, to enable others familiar with the art to adopt and use the same; and will summarize in the claims the novel features of construction, and novel combinations of parts, for which protection is desired.

In said drawing:

Figure 1 is a longitudinal section through an apparatus showing one embodiment of my invention.

Fig. 2 is a longitudinal section similar to Fig. 1, showing a modified arrangement.

Fig. 3 is a longitudinal section similar to Figures 1-2, but showing a further modification of the invention.

As shown in Figure 1, the feed hopper 1 is provided with a bottom 1a and an opening 1b in its side communicating with the inlet of a feed throat housing 2, having flanges 2a secured in any desired manner to feed hopper 1, said housing 2 being cylindrical and having its outer end flared as at 2b to avoid pinching the lip of the rubber lining hereinafter referred to.

Extending axially through cylindrical housing 2 is a worm shaft 3 journaled as at 3a in the far wall 4c of a pressure manifold 4, hereinafter referred to, said manifold 4 having an opening 4a in its near wall 4b through which the outer end of housing 2 projects, as shown in Figure 1, the housing 2 having a flange 2c secured in any desired manner to the near wall 4b of the pressure manifold 4.

Worm shaft 3 carries within housing 2 helical flights 3b of less overall diameter than the internal diameter of housing 2, the flights extending from the interior of the hopper 1 and terminating at a point slightly beyond the outer lip 2b of housing 2, the flights tapering at said outer end at approximately 45° to meet the worm shaft 3, at which point the worm shaft 3 is reduced in diameter as at 3c as indicated in Figure 1, the reduced portion extending into the bearing 3a at the far wall 4c of pressure manifold 4.

Securely mounted within the housing 2 around the periphery of the worm flights 3b is a rubber feed throat lining 5 having at its outer end an integral conical lip 5a, the walls of which are disposed at substantially 45° to the axis of shaft 3, the outer end of the lip embracing the inner end of the reduced portion 3c of the shaft 3, the shoulder formed between the reduced portion 3c and the main body of worm shaft 3 being machined as at 3d to conform with the angle of the worm flight and the lip 5a, shoulder 3d thus forming a support for the outer end of the rubber lip 5a to prevent the lip from being forced rearwardly into the open end of housing 2 by the pressure within pressure manifold 4 which is exerted in the direction of the arrows P shown in Figure 1, and which may be of the magnitude of 100 lbs. per square inch, more or less, while the pressure in the feed hopper 1 would be atmospheric. The arrangement shown in Fig. 1 is simple to construct and is intended for lower pressures and lighter duty than the following embodiments.

In operation, the granular or finely divided material from hopper 1 would be fed by the worm flights 3b when shaft 3 is rotated through the rubber lined feed throat housing 2, the end of the feed throat extending into the pressure manifold 4, the lining 5 having an integral lip 5a contacting the worm shaft shoulder 3d and forming a continuous seal around the shaft 3c at the end of the feed worm flight 3b. The natural resiliency of the rubber of lip 5a and the pressure within the pressure manifold 4 will combine to hold the rubber lip 5a against the sealing surface 3d of the worm axle. The material fed by the flight 3b will under feeding pressure force the lip 5a open, the lip thus accommodating itself to fluctuations in the feed and preventing the pressure from the manifold 4 from blowing the material back through the feed throat 2. In event the flow of material stops, the lip 5a will therefore assume its normal sealing or closed position against the surface 3d of shaft 3 and prevent loss of pressure back through the feed throat.

In the modification shown in Figure 2 the hopper 1 and the feed throat housing 2 is substantially the same as in Fig. 1, and similar parts are similarly numbered. The near wall 4b of the pressure manifold 4 is provided with the opening 4a through which the outer end of the feed throat housing 2 projects, but the outer end of the housing 2 is not flared (as at 2b Fig. 1) but is cut off transversely of the axis of shaft 3.

In this modification the worm shaft 3 terminates slightly within the outer end of housing 2, also the worm flights 3b, as clearly indicated. The rubber feed throat liner 5 is similar to that shown in Figure 1 but same, however, also terminates at the outer end of housing 2, as shown in Figure 2.

In this modification a hollow resilient pillow 6, of general cylindrical shape, is disposed opposite the outer end of housing 2 within pressure manifold 4, said pillow 6 being mounted on a support 7 passing through an opening 4e in the far wall 4c of pressure manifold 4 and clamped in position by means of collars 8—9 threaded upon the threaded end 7a of support 7, said collars 8—9 being disposed at opposite sides of wall 4c to form a pressure tight connection. The threaded end 7a of support 7 passes through an axial opening in the adjacent face of pillow 6, and plates 10—11 are disposed around the supports 7 at opposite sides of the wall of the pillow 6, the same being compressed by nuts 12—13 respectively threaded upon the threaded end of support 7 to squeeze the material of the pillow between the collars 10—11 and firmly mount the pillow 6 on the support 7 in a gas or fluid type manner. Extending through the support 7 are bores 7c and 7d which are valved to permit admission and exhaust of gas or liquid from the interior of pillows 6 to expand or inflate the pillow 6 so that it will normally closely contact the outer end of housing 2 and the end of rubber liner 5. The pillow 6 is inflated with either gas or liquid at sufficient pressure to hold its face 6a firmly against the flush end of the feed throat 2 which extends into the pressure manifold 4. The shaft 7 which holds the pillow in position within the manifold 4 is threaded so that whatever adjustment of the pillow is necessary can be made by manipulating the nuts 8—9.

The gas or liquid enters and is withdrawn from the pillow 6 through the ducts 7c—7d so that a pressure may be set up within the bulb to maintain the seal at the outer end of the throat 2.

In operation the finely divided solid material is fed from the hopper 1 by the worm flights 3b through the rubber lined feed throat 2 where it comes into contact with the face 6a of pillow 6 at the end of the feed throat, the material under pressure forcing the pillow back far enough to permit the material to pass into the pressure manifold 4. The pillow 6 will accommodate itself to fluctuations in the feed, thus permitting the pressure in manifold 4 from blowing the material back through the feed throat 2. In event the material stops flowing, the gas or hydraulic pressure in pillow 6 will force the face 6a of the pillow against the outer end of feed throat 2, preventing loss of pressure back through the feed throat.

In the modification shown in Figure 3 the hopper 1 is similar to that shown in the preceding figures except that at the opening 1b of the feed hopper 1 is a lubricating water ring casting 14 of annular shape, having an internal bore 14a corresponding with the size of the opening 1a, said casting having flanges 14b whereby the ring 14 may be readily secured to the face of hopper 1. The outer end of the bore 14a of ring 14 is countersunk or beveled as at 14c. Within the water ring 14 is an annular water chamber 14d for lubricating water fed thereinto through an inlet 14e, and an annular series of ducts 14f lead from the chamber 14d and discharge at the countersunk or beveled bore 14c of the casting.

In this modification the feed throat housing 2 is of larger diameter than the bore 14a of the lubricating ring 14 by an amount substantially equal to the thickness of the rubber lining 5, said housing 2 being provided with bolting flanges 2a secured to the outer end of the ring 14 and with flanges 2b for attachment to corresponding flanges 15a of a gland housing 15 of slightly larger internal diameter than the feed throat housing 2. The outer end of gland housing 15 is provided with flanges 15b secured to the near wall 4b of pressure manifold 4 having the opening 4a for the passage therethrough of the worm shaft 3 which extends from the hopper through the lined bores of the water ring 14, feed throat housing 2, gland housing 15 and through the pressure manifold 4, the end of the shaft being preferably journaled in the far wall of the manifold 4 in a bearing such as 3a (Fig. 1).

In this modification the rubber lining 5 is similar to the linings disclosed in Figs. 1-2, the same extending from the lubricating ring 14 through the feed throat housing 2 and through the gland housing 15, the ring within the housing 15 having external annular shoulders 5e, 5f of diameter corresponding to the internal diameter of the housing 15, flange 5e seating in the corner formed between the stepped bores of housings 2 and 15, and the flange 5f seating in the corner between the outer wall of the housing 15 and an interior flange 15d at the outer end of the housing 15, the flanges 15e, 15f thus forming seals at each end of the housing around the liner 5 within the housing 15, which portion of the liner is shaped in the manner of an hourglass, as at 5g. The space between the wall of the gland housing 15 and the lining portion 5g between the flanges 5e and 5f forming an expansible gland into which cooling water is fed from a pipe 16, the excess water passing through a standpipe 17 into an airdome 18 for maintaining a substantially constant pressure of water within the gland chamber, the excess water from the pipe 17 passing through a pipe 19 into the inlet 14e of the lubricating water ring 14, as clearly shown.

The valve action in this modification is attained by expanding the gland formed by the portion 5g of the liner 5 inwardly against the worm shaft 3 within the chamber 5, the expansion being accomplished by means of water entering the gland chamber at 16. The pressure within the gland by the water is maintained by the cushioning effect of air trapped in the airdome 18. The water from the gland serves the dual roll of expanding the gland and also as a cooling agent. After leaving the gland the water is carried over through pipe 19 into the lubricating water ring 14 from whence it passes through the holes 14f in the ring 14 and emerges into the rubber feed throat lining 5 in such a manner as to lubricate the lining 5 and the expanding gland 5g.

In operation, the granular or finely ground material is fed by the worm flight 3b through the rubber lined feed throat housing 2, the material forcing the expandable gland 5g open sufficiently for it to pass therethrough into pressure manifold 4. The expanding gland will, through the pressure exerted by the water, accommodate itself to any fluctuations in the flow of material, thus preventing the pressure in the manifold 4 from blowing the material back through the feed throat housing 2. In event the flow of material stops altogether, the water pressure in the expanding chamber of the gland will contract the glands around the axle 3 within chamber 15 with sufficient force to prevent a loss of pressure back through the feed throat 2.

The arrangement shown in Figure 3 makes it possible to feed granular material into a stream of superheated steam at 100 pounds per square inch and at 400° F. within the manifold 4 while keeping the rubber in the expanding gland 5g cool. The water used to maintain the hydraulic pressure in the gland also serves the dual purpose of cooling this element, first entering the gland 5g at a controlled pressure, and after performing its function there, it is carried over into the lubricating water ring 14 and then used to lubricate the rubber feed throat lining 5. This arrangement creates a continuous flow of cooling water for the expanding gland 5g. Rubber lubricated with water has an extremely low friction factor. The quantity of water required to maintain a complete "wetness" over the entire inner surface of the feed throat lining 5 and expanding gland 5g will be sufficient to cool the gland.

The feed worm in a mechanism of this nature is a most expensive item. It should be made of the hardest and most corrosive resistant alloy obtainable. It has to be very rugged and heavy; it is expensive to machine, which makes it costly. One of the greatest advantages of the rubber feed throat lining is that, while it gives a perfect seal around the worm, it prevents wear on the worm because of the fact that any granular particles, which are bound to be sharp, when caught between the worm flight and the feed throat lining, will, instead of cutting warm and lining equally, will embed themselves in the soft rubber and work themselves across the periphery of the worm flight into the space between the next flight, doing virtually no damage to either the worm or lining. Thus the expensive item, the worm, will last longer, and the rubber feed throat lining will outlast any other known material.

I do not limit my invention to the exact forms shown in the drawing, for obviously changes may be made therein within the scope of the claims.

I claim:

1. Means for feeding granular material into a zone of higher pressure; comprising a hopper, a manifold forming the said zone; a feed throat extending from the hopper and discharging into the manifold; an axle extending through said feed throat and having a spiral conveyor flight thereon terminating adjacent the discharge end of the throat; a lining of resilient material within the throat engaged by the periphery of the flight; valve means normally yieldably sealing the discharge end of the throat; the axle beyond the discharge end of the throat being reduced in diameter to form a conical annular shoulder thereon; and said valve means comprising a conical lip of resilient material extending from the adjacent end of the lining and having its outer end yieldably surrounding the reduced portion of the axle at the conical shoulder.

2. Means for feeding granular material into a zone of higher pressure; comprising a hopper, a manifold forming the said zone; a feed throat extending from the hopper and discharging into the manifold; an axle extending through said feed throat and having a spiral conveyor flight thereon terminating adjacent the discharge end of the throat; a lining of resilient material within the throat engaged by the periphery of the flight; the axle beyond the flared end being reduced in diameter to form a conical annular shoulder thereon; a conical lip integral with the adjacent end of the lining and having its outer end yieldably surrounding the reduced portion of the axle at the conical shoulder to normally yieldably seal the discharge end of the throat.

3. In means as set forth in claim 2, said throat having its discharge end flared outwardly.

4. In means as set forth in claim 2, the flight within the conical lip being correspondingly shaped.

JOHN BERRIEN ROGERS.

REFERENCES CITED

The following references are of record in the file of this patent:

UNITED STATES PATENTS

| Number | Name | Date |
|---|---|---|
| 1,376,043 | Sherwood | Apr. 26, 1921 |
| 1,850,683 | Merrill | Mar. 22, 1932 |
| 2,028,407 | Moineau | Jan. 21, 1936 |
| 2,184,248 | Bonotto | Dec. 19, 1939 |
| 2,321,015 | Davis | June 8, 1943 |

FOREIGN PATENTS

| Number | Country | Date |
|---|---|---|
| 675,772 | Germany | May 17, 1939 |